(12) United States Patent
Fukui et al.

(10) Patent No.: US 8,152,220 B2
(45) Date of Patent: Apr. 10, 2012

(54) REAR DOOR

(75) Inventors: Kazuo Fukui, Chiryu (JP); Nobuhide Hashimoto, Okazaki (JP); Teruji Kuroyanagi, Anjo (JP); Sadaharu Kagami, Nagoya (JP); Hiroaki Fukunaga, Aichi-gun (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 0 days.

(21) Appl. No.: 12/852,896

(22) Filed: Aug. 9, 2010

(65) Prior Publication Data
US 2010/0320799 A1 Dec. 23, 2010

Related U.S. Application Data

(63) Continuation-in-part of application No. PCT/JP2009/052608, filed on Feb. 17, 2009.

(30) Foreign Application Priority Data

Feb. 18, 2008 (JP) ................................ 2008-035424

(51) Int. Cl.
*B60J 5/10* (2006.01)
(52) U.S. Cl. ................. 296/146.7; 296/146.8; 296/1.02; 16/110.1
(58) Field of Classification Search ................ 296/146.8, 296/146.7, 1.08, 1.02, 106, 56; 16/110.1
See application file for complete search history.

(56) References Cited

U.S. PATENT DOCUMENTS
6,371,549 B2 * 4/2002 Kim ........................... 296/146.8

FOREIGN PATENT DOCUMENTS
| JP | U-1-120418 | 8/1989 |
| JP | A-9-193665 | 7/1997 |
| JP | A-10-244837 | 9/1998 |
| JP | A-2000-355220 | 12/2000 |

OTHER PUBLICATIONS

International Search Report for International Application No. PCT/JP2009/052608, mailed on May 26, 2009 (w/ English translation).
Translation of International Preliminary Report on Patent Ability issued in International Patent Application No. PCT/JP2009/052608 dated May 26, 2009.
Written Opinion of the International Searching Authority issued in International Patent Application No. PCT/JP2009/052608 dated May 26, 2009 (with translation).

* cited by examiner

*Primary Examiner* — Glenn Dayoan
*Assistant Examiner* — Melissa A Black
(74) *Attorney, Agent, or Firm* — Oliff & Berridge, PLC

(57) ABSTRACT

A rear door that includes an upper section, a lower section that connects to the upper section, a trim provided to an inner face of the rear door, and a pull handle portion provided in an interior-side design surface of the trim, the pull handle portion including a handle opening formed in the interior-side design surface at a position spaced from a lower end of the trim in an upward direction, and a recessed portion that runs obliquely downwards, in a state where the rear door is closed, from the handle opening toward a rear of a vehicle body, wherein a section of the trim sandwiched between the handle opening and the lower end of the trim has an outer face that is sunken relative to the interior-side design surface of a general portion of the trim.

1 Claim, 4 Drawing Sheets

REAR DOOR

CROSS-REFERENCE TO RELATED APPLICATION

This application is a continuation-in-part of International Application No. PCT/JP2009/052608, filed Feb. 17, 2009, which claims priority from Japanese Patent Application No. 2008-035424, filed on Feb. 18, 2008. The disclosure of the foregoing application is hereby incorporated by reference in its entirety.

BACKGROUND

The present invention relates to a rear door, and more particularly, to a rear door swingably attached to the rear end of a car.

Conventionally, a car is provided with a rear door at its rear end. There are various types of rear doors. A rear door used particularly for a one-box car, a minivan, a hatchback and the like is typically a single, top-hinged flip-up door. This rear door has a resin trim, which is an upholstery component, provided on an inner face facing a vehicle interior side. This trim can improve the appearance of the interior, as well as provides sound insulation, heat resistance, and shock resistance. A trim panel structure for a rear door of a car is known, for example, wherein a hole is formed in a lower end portion of an inner panel of the rear door, and a door operation handle integrally formed with the trim panel is fitted in the hole.

With a flip-up door, when the door is opened, its lower portion flips up. Therefore, depending on the height of a passenger, the passenger sometimes could not reach the outer face of the back door and it was difficult for the passenger to swing the rear door downwards. To solve this problem, for example, a rear door is known that has a pull handle portion formed as a recess running obliquely downwards from an opening formed in an interior-side design surface of the trim toward the rear of a vehicle body. When closing this rear door, with the palm facing the passenger, the passenger grasps the opening of the pull handle portion with fingers from the rear of the vehicle body and pulls the door downward to swing it downward. The passenger then pulls out the hand from the pull handle portion and pushes the outer face of the rear door toward an opening portion in the rear end of the vehicle. Thus, the rear door can be closed easily and safely irrespective of the passenger's height.

However, when the flip-up rear door is fully opened, its lower portion comes to a substantially horizontal position. Therefore, depending on the height of the passenger, the interior-side design surface of the trim sometimes could not be seen from the rear of the vehicle body. In this case, since the passenger could not see the opening of the pull handle portion formed in the interior-side design surface, the passenger would have to find the position of the pull handle portion by bending down below the rear door, which was inconvenient.

SUMMARY

Various exemplary embodiments of the general principles described herein provide a rear door that allows easy recognition of a position of a pull handle portion from the rear of a vehicle body when the rear door is opened.

Exemplary embodiments provide a rear door that is attached to close an opening portion provided at a rear end of a vehicle body. The rear door includes an upper section, a lower section, a trim, a pull handle portion. The upper section has a top side at which the rear door is pivotally supported at an upper end of the opening portion and around which the rear door is swingable in an up and down direction. The lower section connects to a lower end of the upper section and comes to a substantially horizontal position when the rear door is fully opened. The trim is provided to an inner face of the rear door. The pull handle portion is provided in an interior-side design surface of the trim, and includes a handle opening and a recessed portion. The handle opening is formed in the interior-side design surface at a position spaced from a lower end of the trim in an upward direction. The recessed portion runs obliquely downwards, in a state where the rear door is closed, from the handle opening toward a rear of the vehicle body. Further, a section of the trim that is sandwiched between the handle opening and the lower end of the trim has an outer face that is sunken relative to the interior-side design surface of a general portion of the trim.

DETAILED DESCRIPTION OF THE EXEMPLARY EMBODIMENTS

Figure 1:
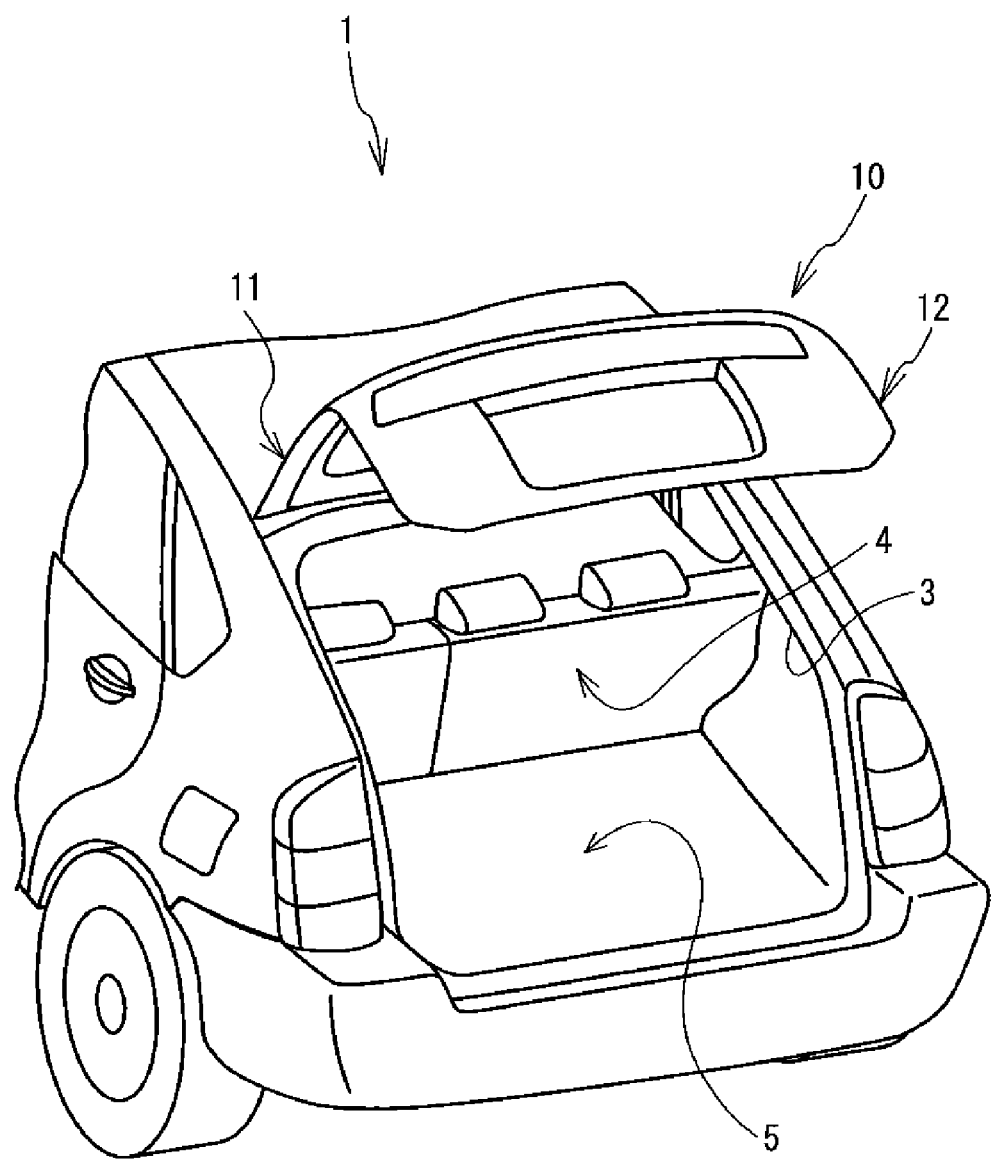
FIG. 1 is a perspective view of a rear portion of a car 1 (when a rear door 10 is opened).

Hereinafter a rear door 10 according to an embodiment of the present disclosure will be described with reference to the drawings. A car 1 shown in FIG. 1 is a hatchback car.

First, a rear end structure of the car 1 will be described. As shown in FIG. 1, an opening portion 3 is provided in the rear end of the car 1. To the opening portion 3 is provided the rear door 10 curving in a substantially L-shape when viewed from a side such that the rear door 10 can be opened and closed. This rear door 10 is a single so-called "flip-up" door, and its top end 13 (see FIG. 4) is swingably coupled to an upper portion of the opening portion 3 via a hinge (not shown). Thus the rear door 10 may swing in an up and down direction. Opening the rear door 10 exposes a luggage space 5 provided at the back of rear seats 4 so that luggage can be loaded and unloaded.

Figure 2:
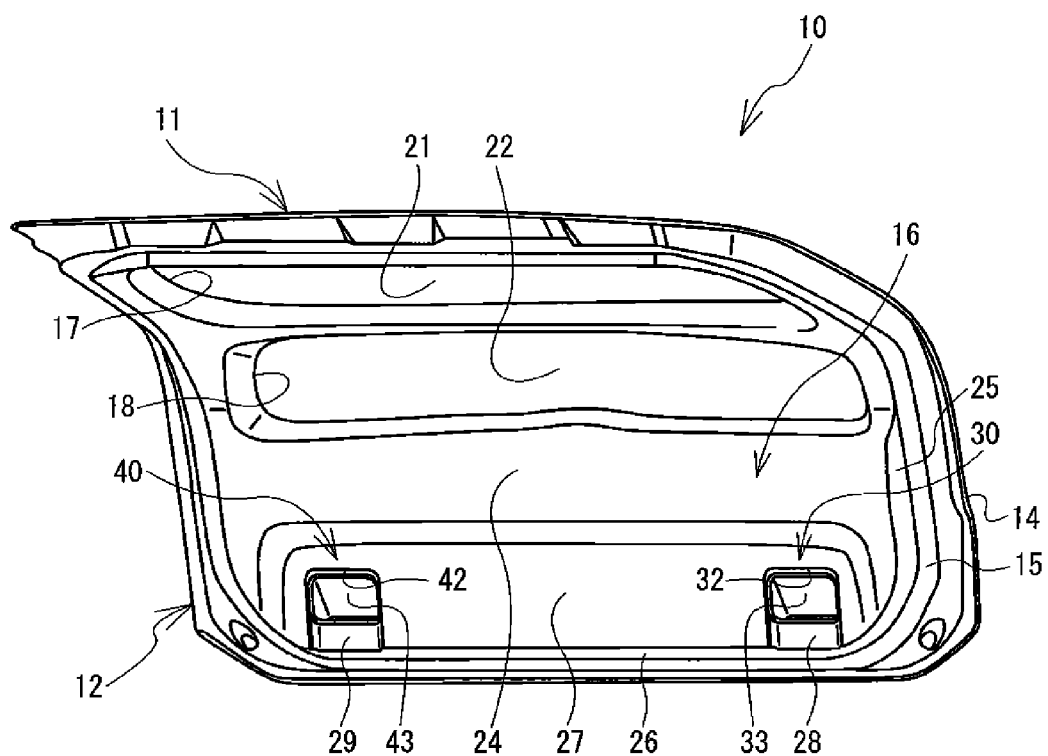
FIG. 2 is a perspective view of an inner face side of the rear door 10.

Next, a structure of the rear door 10 will be described. As shown in FIG. 2, the rear door 10 has a structure in which it curves in a substantially L-shape when viewed from the side and has an outer panel 14 and an inner panel 15 joined together. A resin trim 16 is attached to an inner face of the rear door 10 facing a vehicle interior side. The trim 16 is an upholstery component having a specified thickness, and its surface facing the vehicle interior side forms an interior-side design surface 24. Trim side faces 25 are formed in side end portions of the trim 16 and a trim bottom face 26 is formed in a lower end portion of the trim 26. When the rear door 10 is closed, the inner panel 15 is not visible because of the trim side faces 25 and the trim bottom face 26.

The rear door 10 may be sectioned into an upper section 11 extending obliquely downwards from the upper portion of the opening portion 3 (see FIG. 1) toward the rear of the vehicle, and a lower section 12 extending from a lower end of the upper section 11 toward a lower portion of the opening portion 3. A rectangular window opening 17 that is horizontally long when viewed from the front is provided substantially in the center of the upper section 11. A glass window 21 is fitted in the window opening 17. On the other hand, a rectangular window opening 18 that is horizontally long when viewed from the front is provided substantially in the center on the upper side of the lower section 12. A glass window 22 is fitted in the window opening 18.

Further, as shown in FIG. 2, in the lower portion of the interior-side design surface 24 of the trim 16, a recessed portion 27 is formed over a substantially entire area in a width direction. In a right side portion of this recessed portion 27 when viewed from the vehicle interior, a pull handle portion 30 formed in a shape of a recess is provided, to be grasped by a hand from the rear of the car 1, when the rear door 10 is opened, for closing the opened rear door 10. A pull handle portion 40 of the same shape is provided in a left side portion of the recessed portion 27.

Figure 3:
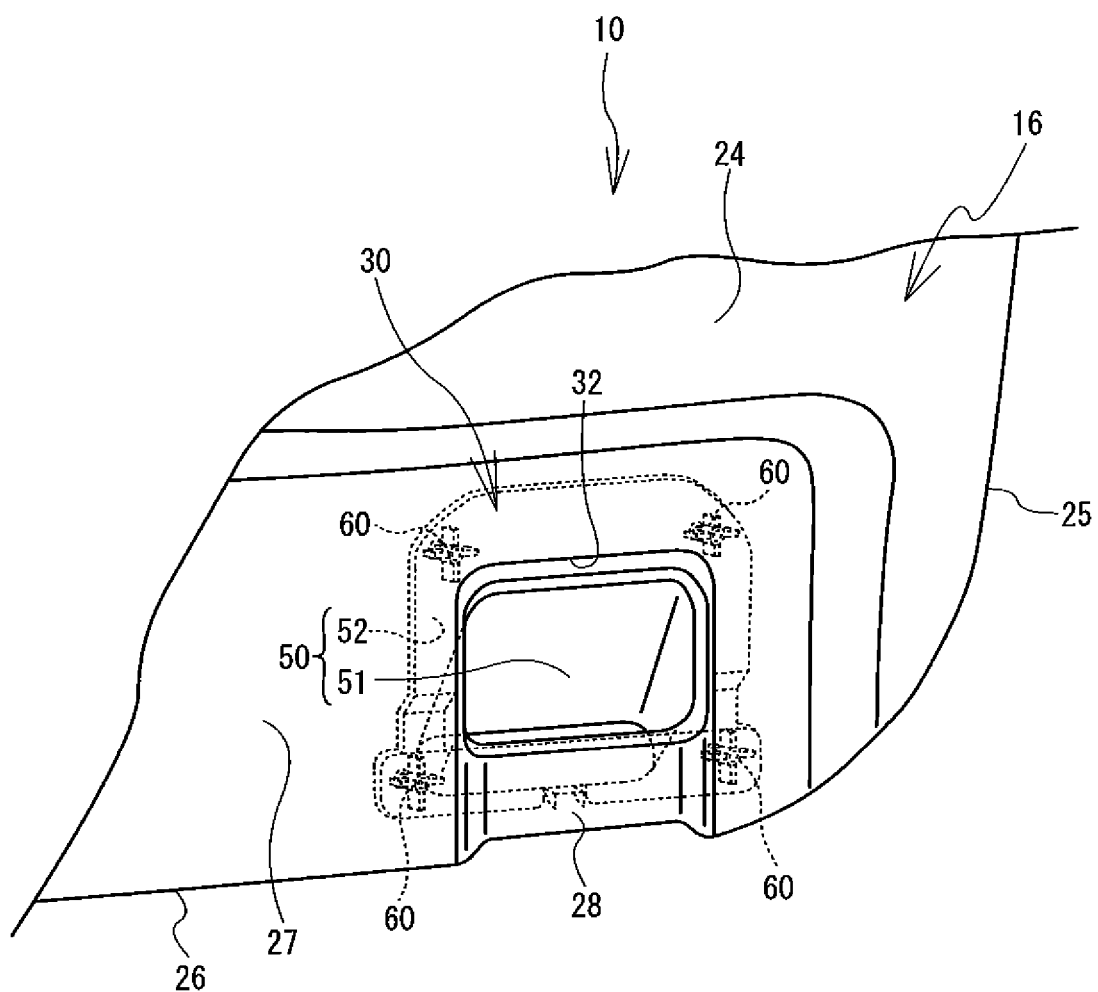
FIG. 3 is a partially enlarged view of the vicinity of a pull handle portion 30.

Next, a structure of the pull handle portions 30 and 40 will be described in more specific terms. Since the pull handle portions 30 and 40 both have the same structure, the structure of the pull handle portion 30 will be mainly described here. As shown in FIG. 3, the pull handle portion 30 includes a handle opening portion 32 that is rectangular when viewed from the front and formed in the right side portion of the recessed portion 27 in the interior-side design surface 24 of the trim 16, and a handle receiving member 50 that has a bottomed tubular shape and that is secured to a rear face of the trim 16 and connects to the handle opening portion 32. Corners along an inner edge of the handle opening portion 32 are processed into a tapered form. Thus a hand can be easily inserted into the handle opening portion 32. The handle receiving member 50 includes a receiving portion 51 formed in a bottomed tubular shape, and a frame portion 52 that is rectangular when viewed from the front and formed along an outer edge of an opening of the receiving portion 51, to be abutted against and secured to the rear face of the trim 16.

The receiving portion 51 is formed such that its inside gradually decreases in dimension from the rectangular opening towards the bottom side, and corners on its inner face are processed into a tapered form. Thus a hand can be easily inserted into the receiving portion 51 and finger tips can be tightly contacted on the bottom side of the receiving portion 51. The frame portion 52 is provided along the outer edge of the rectangular opening of the receiving portion 51 and formed in a frame shape having a specified width. In the vicinities of four vertices of this frame portion 52, thermal caulking portions 60 each formed in a protruded shape are respectively provided to be secured to the rear face of the trim 16. The receiving portion 51 and the frame portion 52 are made of resin in one piece.

The handle receiving member 50 having the above-described structure is secured to the rear face of the trim 16 beforehand. This procedure will be explained. First, the opening of the receiving portion 51 is aligned with the handle opening portion 32 formed in the recessed portion 27 in the lower portion of the interior-side design surface 24 of the trim 16, and the frame portion 52 is abutted against the rear face of the trim 16. Then, the four thermal caulking portions 60 of the frame portion 52 are thermally caulked to the rear face of the trim 16. Thus the frame portion 52 is secured on the rear face of the trim 16 so that the handle receiving member 50 is secured to the rear face of the trim 16. The trim 16 is then attached to the inner panel 15 of the rear door 10. The pull handle portion 30 is thus provided in the right side portion in the recessed portion 27 in the lower portion of the interior-side design surface 24 of the trim 16 attached to the rear door 10. The pull handle portion 30 can be provided with a recessed shape wherein, with the rear door 10 closed, it runs obliquely downwards from the handle opening portion 32 toward the rear of the car 1.

As shown in FIG. 3, when the pull handle portion 30 is viewed from the vehicle interior, a section 28 that is rectangular when viewed from the front and sandwiched between the handle opening portion 32 formed in the trim 16 and the lower end of the trim 16 is sunken toward the rear of the car 1 relative to the recessed portion 27 of the trim 16. This section 28 extends as far as to the lower end of the trim 16. Therefore, the trim bottom face 26 of the trim 16 is formed as a recess in a portion that corresponds to the pull handle portion 30.

The same applies to the pull handle portion 40. As shown in FIG. 2, when the pull handle portion 40 is viewed from the vehicle interior, a section 29 that is rectangular when viewed from the front and sandwiched between the handle opening portion 42 formed in the trim 16 and the lower end of the trim 16 is sunken toward the rear of the car 1 relative to the recessed portion 27 of the trim 16. This section 29 extends as far as to the lower end of the trim 16. Therefore, the trim bottom face 26 of the trim 16 is formed as a recess in a portion that corresponds to the pull handle portion 40, similarly with the pull handle portion 30.

Figure 4:
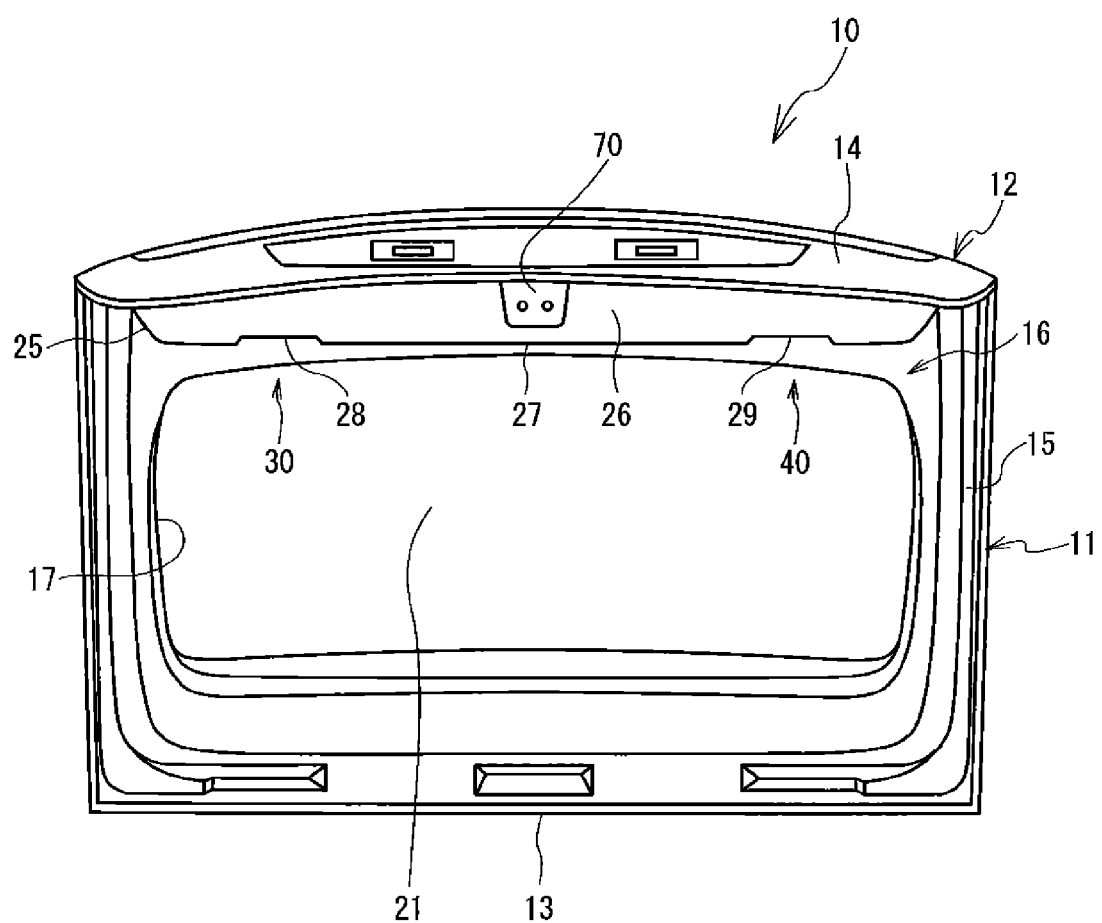
FIG. 4 is a view of the rear door 10 viewed from the rear of the vehicle when the rear door 10 is fully opened.

Next, an operation procedure for closing the rear door 10 will be described. First, the passenger goes round behind the car 1 with its rear door 10 fully opened as shown in FIG. 1, and stands to face the opening portion 3. In a state where the rear door 10 is fully opened, as shown in FIG. 4, the inner face on the vehicle interior side of the upper section 11 is directed to face the rear of the car 1. At this time, the lower section 12 of the rear door 10 is substantially horizontal. In this state, the lower end of the rear door 10 is directed toward the rear of the car 1. Therefore, the passenger standing behind the car 1 can see the trim bottom face 26 of the trim 16 but not the interior-side design surface 24. In other words, depending on the height of the passenger, the handle opening portion 32 of the pull handle portion 30 and the handle opening portion 42 of the pull handle portion 40 may not be visible.

However, with the rear door 10 of the present embodiment, as shown in FIG. 4, there exists the section 28 that is formed at a position corresponding to the handle opening portion 32 of the pull handle portion 30 and that is sunken relative to the recessed portion 27 in the lower portion of the interior-side design surface 24, and there also exists the section 29 that is formed at a position corresponding to the handle opening portion 42 of the pull handle portion 40 and that is sunken relative to the recessed portion 27 in the lower portion of the interior-side design surface 24, and thus the trim bottom face 26 is recessed at these portions 28 and 29. Therefore, from the respective positions of the recessed portions 28 and 29 in the trim bottom face 26, the passenger can easily figure out the positions of the handle opening portions 32 and 42 of the pull handle portions 30 and 40. In other words, the passenger can readily recognize the respective positions of the pull handle portions 30 and 40 without having to bend down below the rear door 10.

Having recognized each position of the pull handle portions 30 and 40, the passenger inserts one hand into the handle opening portion 32 of the pull handle portion 30 (or the handle opening portion 42 of the pull handle portion 40) in the rear door 10 and grasps it with fingers. Next, with the fingers grasping the pull handle portion 30, the passenger pulls down the rear door 10 to swing it downwards. Then, putting the other hand on the outer face of the rear door 10 that has been swung downwards, the passenger pulls out the hand from the handle opening portion 32 of the pull handle portion 30, and pushes the rear door toward the opening portion 3 of the car 1 with force. This causes an engaging portion 70 provided substantially in the middle at the lower end of the rear door 10 to engage with an engaging portion (not shown) provided on the rear side of the luggage space 5. Thus the passenger can easily and smoothly close the rear door 10.

As described above, the rear door 10 of the present embodiment is attached to the rear end of the car 1 such that it can be opened and closed. The resin trim 16 is provided on the inner face of the rear door 10. In the recessed portion 27 formed in the lower portion of the interior-side design surface 24 of the trim 16, the pull handle portion 30 to be grasped by fingers when closing the rear door 10 is provided. The pull handle portion 30 has a shape of a recess running obliquely downwards from the handle opening portion 32 formed in the recessed portion 27 of the trim 16 toward the rear of the car 1. The section 28 sandwiched between the handle opening portion 32 and the lower end of the trim 16 is formed such that it is sunken relative to the recessed portion 27 of the trim 16. In other words, the trim bottom face 26 is recessed in this section 28. Therefore, even when the interior-side design surface 24 of the rear door 10 that is fully opened is not visible from the rear of the car 1, the position of the handle opening portion 32 of the pull handle portion 30 can be easily figured out from the position of the recessed section 28 in the trim bottom face 26.

According to the present disclosure, since the pull handle portion is provided in the interior-side design surface of the trim on the inner face, when the rear door is opened, the passenger can swing the rear door to close the opening portion by pulling the rear door downwards with fingers grasping the pull handle portion from the rear of the vehicle body. Since the pull handle portion has an outer face that is sunken relative to a general portion and extends as far as to the lower end of the trim, even though the lower portion of the rear door is substantially horizontal when the door is fully opened and the interior-side design surface of the trim is not visible from the rear of the vehicle body, the position of the pull handle portion is clearly recognizable.

The present disclosure should not be limited to the above-described embodiment and various modifications are possible. For example, while the pull handle portion 30 in the above-described embodiment is formed by securing the handle receiving member 50 to the rear face of the trim 16, the pull handle portion may be formed by forming the handle receiving member 50 integrally with the trim 16.

The rear door of the present disclosure is applicable particularly to one-box cars, minivans, hatchbacks and the like.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A rear door that is attached to close an opening portion provided at a rear end of a vehicle body, the rear door comprising:
   an upper section that has a top side at which the rear door is pivotally supported at an upper end of the opening portion and around which the rear door is swingable in an up and down direction;
   a lower section that connects to a lower end of the upper section and that comes to a substantially horizontal position when the rear door is fully opened;
   a trim that is provided to an inner face of the rear door;
   a pull handle portion that is provided in an interior-side design surface of the trim, the pull handle portion including:
      a handle opening that is formed in the interior-side design surface at a position spaced from a lower end of the trim in an upward direction; and
      a recessed portion that runs obliquely downwards, in a state where the rear door is closed, from the handle opening toward a rear of the vehicle body; and
   a sunken portion that extends from a lower end of the handle opening to the lower end of the trim and that has an outer face that is sunken relative to the interior-side design surface of a general portion of the trim.

* * * * *